Mar. 3, 1925.  
1,528,329
J. H. HASTINGS  
APPARATUS FOR STIRRING LIQUIDS  
Filed Nov. 7, 1922
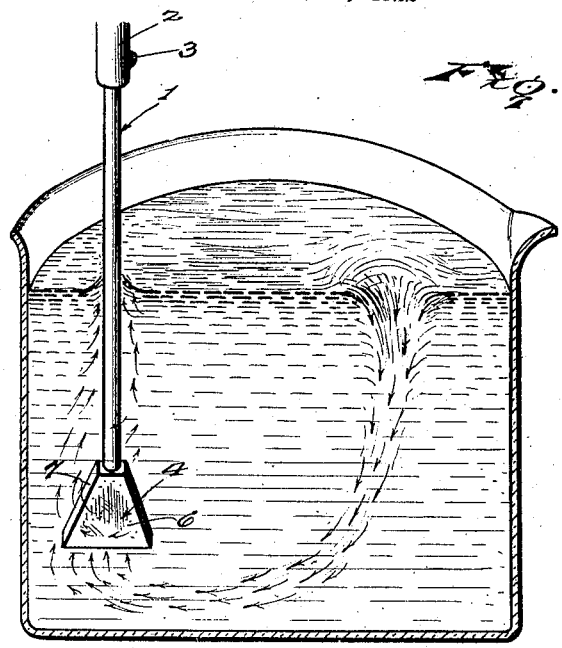
Fig. 1.
Fig. 2.
Fig. 3.
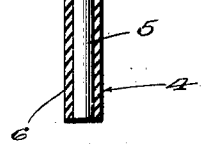
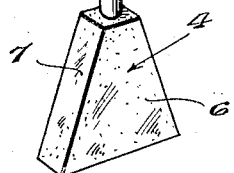
Inventor  
J. H. Hastings  
By Lacey & Lacey, Attorney Patented Mar. 3, 1925.

1,528,329

UNITED STATES PATENT OFFICE.

JOHN HARTLEY HASTINGS, OF DONORA, PENNSYLVANIA.

APPARATUS FOR STIRRING LIQUIDS.

Application filed November 7, 1922. Serial No. 599,610.

*To all whom it may concern:*

Be it known that I, JOHN HARTLEY HASTINGS, a citizen of the United States, residing at Donora, in the county of Washington and State of Pennsylvania, have invented certain new and useful Improvements in Apparatus for Stirring Liquids, of which the following is a specification.

This invention relates to improvements in stirring apparatus the invention being designed primarily for use in the chemical laboratory, although not restricted to this use. In mixing liquids, in the chemical laboratory, it is at present customary to employ an electrically driven stirrer which is positioned within the liquid within the beaker glass or other utensil substantially at the center of the body of liquid, and being rapidly rotated, creates a vortex which because of its central location in the body of liquid will result in a rise of the liquid upon the walls of the beaker glass with likelihood of spilling of the liquid. Therefore, it is one of the primary objects of the present invention to provide a novel form of stirrer particularly adapted for the carrying out of the method.

Another object of the invention is to provide a stirrer so constructed and adapted to be employed in such a manner as to more thoroughly agitate the liquid in which it is operated without any likelihood, however, of throwing the liquid from the beaker glass or other utensil.

In the accompanying drawings:

Figure 1 is a perspective view illustrating the stirrer embodying the invention and the manner in which the same is employed in carrying out the method;

Fig. 2 is a detail perspective view of the stirrer;

Fig. 3 is an axial sectional view through the stirrer.

The stirrer embodying the invention comprises a shank 1 which may be in the nature of a glass rod and which is adapted to be fitted at its upper end into a chuck 2 constituting a part of an electrically driven stirring apparatus (not shown), the rod being secured within the chuck as, for example, by a set screw 3. At its lower end the rod has fitted to it a stirrer head which is indicated in general by the numeral 4. This stirrer head is preferably formed from hard or vulcanized rubber and is provided with a central bore 5 to snugly receive the lower end of the rod 1. The head 4 is preferably of the substantially triangular form illustrated in the drawings, having flat side faces 6 and inclined faces 7, which latter converge in the direction of the upper end of the head or, in other words, in the direction of the upper portion of the stem, the head being therefore arranged with its base lowermost and its apex uppermost. The head is adapted to be either frictionally fitted on the stem, vulcanized, or molded thereon, or secured in any other suitable manner, and being of rubber will not be liable to fracture the beaker glass or other utensil in which it is operated, should it come in contact with the wall of the glass.

In carrying out the method embodying the invention, the stirrer is introduced into the liquid contained in the beaker glass or other utensil, not centrally of the body of liquid as is usually done, but to one side of the center as best shown in Figure 1 of the drawings. Due to the peculiar formation of the head of the stirrer, when the stirrer is rapidly rotated, vertical currents will be created in the body of liquid rising about the stem of the stirrer, and the upwardly flowing vortex thus created will induce the formation of a vortex in the body of the liquid at the opposite side of and substantially the same distance from the center of the body as illustrated clearly in Figure 1 and as indicated by the arrows in said figure. By following this method of stirring the liquid, the liquid is more thoroughly agitated than is the case where an ordinary stirrer is operated in the usual location in the body of liquid, and there is no likelihood of the liquid being spilled or thrown out of the beaker glass or other utensil notwithstanding the creation of vortical currents in the liquid.

As stated the head 4 is formed from hard or semi-hard rubber and is therefore more or less yieldable to impacts, and as a consequence even should it strike against the wall of the beaker glass or other utensil, it would not be liable to break the glass.

While the head is illustrated and described above as being substantially of triangular form, it will be understood, of course, that it might be given some other shape if found desirable. It is preferable, however, that the head be flat sided and of increasing width from its upper to its lower end.

Having thus described the invention, what is claimed as new is:

1. A stirrer comprising a rotatable stem, and an imperforate stirrer head mounted thereon, the said head having oppositely located side faces and oppositely located edge faces, the said side faces of the head occupying parallel planes, and the said edge faces occupying planes upwardly inclined from the bottom of the head to the upper end thereof whereby the minor end of the head is located uppermost and the wider end of the head is located lowermost, the said head being of a thickness between its side faces but slightly more than the diameter of the stem.

2. Apparatus for stirring liquids comprising a substantially cylindrical vessel, and a rotatable stirrer operating therewithin and comprising a rotatable stem vertically arranged within the vessel eccentric to the axis of the vessel, and a flat-sided imperforate substantially triangular head carried at the lower end of the stem, the head being arranged with its wider end lowermost.

In testimony whereof I affix my signature.

JOHN HARTLEY HASTINGS. [L. S.]